United States Patent
Li et al.

(10) Patent No.: US 9,199,882 B2
(45) Date of Patent: Dec. 1, 2015

(54) SCHEELITE MICROWAVE DIELECTRIC CERAMIC MATERIAL AND PREPARATION METHOD THEREOF

(71) Applicant: Huawei Technologies Co., Ltd., Shenzhen (CN)

(72) Inventors: Jinyan Li, Shenzhen (CN); Ying Liang, Shenzhen (CN); Di Zhou, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/514,806

(22) Filed: Oct. 15, 2014

(65) Prior Publication Data

US 2015/0031523 A1    Jan. 29, 2015

Related U.S. Application Data

(63) Continuation of application No. PCT/CN2013/085107, filed on Oct. 12, 2013.

(30) Foreign Application Priority Data

Mar. 20, 2013    (CN) .......................... 2013 1 00915792

(51) Int. Cl.
| | |
|---|---|
| *C04B 35/495* | (2006.01) |
| *C04B 35/626* | (2006.01) |
| *H01B 3/12* | (2006.01) |
| *C04B 35/453* | (2006.01) |
| *H01G 4/12* | (2006.01) |
| *C04B 35/64* | (2006.01) |

(52) U.S. Cl.
CPC ............. *C04B 35/495* (2013.01); *C04B 35/453* (2013.01); *C04B 35/6261* (2013.01); *C04B 35/62675* (2013.01); *C04B 35/62695* (2013.01); *C04B 35/64* (2013.01); *H01B 3/12* (2013.01); *H01G 4/1209* (2013.01); *C04B 2235/3208* (2013.01); *C04B 2235/3239* (2013.01); *C04B 2235/3256* (2013.01); *C04B 2235/3286* (2013.01); *C04B 2235/3293* (2013.01); *C04B 2235/3298* (2013.01); *C04B 2235/5436* (2013.01); *C04B 2235/6567* (2013.01); *C04B 2235/96* (2013.01)

(58) Field of Classification Search
CPC ............................... C04B 35/495; H01B 3/12
See application file for complete search history.

(56) References Cited

FOREIGN PATENT DOCUMENTS

| | | | |
|---|---|---|---|
| CN | 101823879 | * | 9/2010 |
| CN | 102249663 | A | 11/2011 |
| CN | 102249664 | A | 11/2011 |
| CN | 103172376 | A | 6/2013 |
| CN | 103951425 | * | 7/2014 |

OTHER PUBLICATIONS

Duraisamy, T., et al., "Nax/2Bi1-x/2MoxV1-xO4 and Bi1-x/3MoxV1-xO4—New Scheelite-related phases," Solid State Ionics, vol. 120, Issues 1-4, May 1, 1999, pp. 233-237.

Hartmanova, M., et al., "Structure and Electrical Conductivity of Multicomponent Metal Oxides Having Scheelite Structure," Russian Journal of Electrochemistry, vol. 45, No. 6, Jun. 2009, pp. 621-629.

Zhou, D., et al., "Ferroelastic phase transition compositional dependence for solid-solution [(Li0.5Bi0.5)xBi1-x] [MoxV1]O4 scheelite-structured microwave dielectric ceramics," Acta Materialia, vol. 59, Issue 4, Feb. 2011, pp. 1502-1509.

Zhou, D., et al., "Microwave Dielectric Properties of Li2(M2+)2Mo3O12 and Li3(M3+)Mo3O12 (M=Zn, Ca, Al, and In) Lyonsite-Related Type Ceramics with Ultra-Low Sintering Temperatures," Journal of the American Ceramic Society, vol. 94, No. 3, Mar. 2011, pp. 802-805.

Zhou, D., et al., "Phase transistion, Raman spectra, infrared spectra, band gap and microwave dielectric properties of low temperature firing (Na0.5xBi1-0.5x)(MoxV1-x)O4 solid solution ceramics with scheelite structures," Journal of Materials Chemistry, vol. 21, Oct. 19, 2011, pp. 18412-18420.

* cited by examiner

*Primary Examiner* — Karl Group
(74) *Attorney, Agent, or Firm* — Slater & Matsil, L.L.P.

(57) ABSTRACT

An embodiment of the present invention provides a scheelite microwave dielectric ceramic material. For example, a structure expression of the scheelite microwave dielectric ceramic material can be $Bi(V_{1-x}In_{x/3}Mo_{2x/3})MoO_4$. In this embodiment, $0.06 \leq x \leq 0.12$ An embodiment of the present invention further provides a method for preparing a scheelite microwave dielectric ceramic material.

14 Claims, No Drawings

SCHEELITE MICROWAVE DIELECTRIC CERAMIC MATERIAL AND PREPARATION METHOD THEREOF

This application is a continuation of International Application No. PCT/CN2013/085107, filed on Oct. 12, 2013, which claims priority to Chinese Patent Application No. 201310091579.2, filed on Mar. 20, 2013, both of which are hereby incorporated by reference in their entireties.

TECHNICAL FIELD

The present invention relates to the field of electronic ceramic and preparation thereof, and in particular, to a scheelite microwave dielectric ceramic material and a preparation method thereof.

BACKGROUND

A microwave dielectric ceramic is a new functional electronic ceramic material that has been developing rapidly in recent three decades, which features low loss, a small frequency temperature coefficient, a high dielectric constant, and so on. This microwave ceramic material may be made into a dielectric resonator, a dielectric filter, a duplexer, a microwave dielectric antenna, a dielectric frequency oscillator, a dielectric waveguide transmission line, and other components. These components are widely applied to various fields such as mobile communications, satellite television broadcast communications, radar, satellite navigation and positioning system.

The microwave dielectric ceramic material applied to a modern communications technology needs to meet the following performance requirements: (1) A serial dielectric constant $\in_r$ to meet requirements of different components for different frequency bands; (2) Minimum dielectric loss tan δ or high quality factor value Q (Q=1/tan δ, often represented by Q×f, where f indicates a working frequency or a resonant frequency, the Q value of a material of practical value should at least be over 1000, and Q×f>5000 GHz. For example, Q×f of an $Al_2O_3$ based material is up to a million) to ensure an excellent frequency selective feature; (3) Close to zero temperature coefficient of resonant frequency (TCF) (τf) (for most dielectric materials, the $\tau_f$ depends on a temperature coefficient of a dielectric constant), so as to ensure fine temperature stability of a component; (4) Low-cost environment-friendly material.

In order to meet needs of miniaturization and integration of a component, a focus and an emphasis of current research are to find, prepare and develop new microwave dielectric ceramic that features a high dielectric constant ($\in_r$>45, a high K value), low loss (Q×f>5000 GHz), a close to zero temperature coefficient of resonant frequency (TCF=0 ppm/° C.), a low cost (containing no or a small amount of precious metal), environment-friendliness (at least lead-free, containing no or a relatively small amount of toxic raw materials).

SUMMARY

In view of this, in a first aspect, an embodiment of the present invention provides a scheelite microwave dielectric ceramic material, which features a high microwave dielectric constant, good microwave performance, and an adjustable temperature coefficient of resonant frequency. In addition, the scheelite microwave dielectric ceramic material may be obtained by means of low-temperature sintering without adding any sintering aid, and therefore chemical composition and a preparation process are simple, and the material has a single phase. In a second aspect, an embodiment of the present invention provides a method for preparing a scheelite microwave dielectric ceramic material.

In a first aspect, an embodiment of the present invention provides a scheelite microwave dielectric ceramic material with the following structure expression:

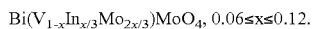

$Bi(V_{1-x}In_{x/3}Mo_{2x/3})MoO_4$, 0.06≤x≤0.12.

The scheelite microwave dielectric ceramic material is based on a typical scheelite $ABO_4$, and $Bi^{+3}$ ion occupies A site, whereas $V^{5+}$, $In^{3+}$, and $Mo^{6+}$ ions jointly occupy B site.

Preferably, 0.08≤x≤0.10.

Preferably, a microwave dielectric constant $\in_r$ of the scheelite microwave dielectric ceramic material is 70-75, a quality factor value Q×f is 9230 GHz-10110 GHz, and a temperature coefficient of resonant frequency $\tau_f$ is −210 ppm/° C. to +135 ppm/° C.

The scheelite microwave dielectric ceramic material provided by the first aspect of the embodiment of the present invention features a high microwave dielectric constant, good microwave performance, and an adjustable temperature coefficient of resonant frequency, and may be used as a dielectric material such as a radio frequency multilayer ceramic capacitor, a chip microwave dielectric resonator or filter, low temperature co-fired ceramic (LTCC), a ceramic antenna, or a multi-chip module (MCM).

In a second aspect, an embodiment of the present invention provides a method for preparing a scheelite microwave dielectric ceramic material, including the following steps:

1) Determine ratios of materials $V_2O_5$, $In_2O_3$, $MoO_3$, and $Bi_2O_3$ according to a stoichiometry ratio in a general formula $Bi(V_{1-x}In_{x/3}Mo_{2x/3})MoO_4$, 0.06≤x≤0.12.

2) Mix the materials in step 1), and after 3-6 hours of ball-milling, drying at 100° C.-200° C., sieve and compress the materials into blocks.

3) Pre-sinter the blocks at 650° C.-750° C., and insulate the blocks for 4-6 hours to obtain sample clinkers.

4) Grind the sample clinkers, and after 5-6 hours of second ball-milling, drying at 100° C.-200° C., granulating and then sieving, obtain ceramic powder.

5) Compress and mould the ceramic powder, sinter the powder for 2-3 hours at 780° C.-840° C. into ceramic, and then obtain a scheelite microwave dielectric ceramic material.

The scheelite microwave dielectric ceramic material is prepared by adopting a solid phase reaction sintering method, that is, low-temperature sintering at 780° C.-840° C. on a premise that no sintering aid is added, using low melting point oxides $MoO_3$, $Bi_2O_3$, and $V_2O_5$ as main elements, a typical scheelite $ABO_4$ as a basis, and with $Bi^{+3}$ ion occupying A site, and $V^{5+}$, $In^{3+}$, and $Mo^{6+}$ ions jointly occupying B site.

Preferably, 0.08≤x≤0.10.

Preferably, the microwave dielectric constant $\in_r$ of the scheelite microwave dielectric ceramic material is 70-75, the quality factor value Q×f is 9230 GHz-10110 GHz, and the temperature coefficient of resonant frequency $\tau_f$ is −210 ppm/° C. to +135 ppm/° C.

Preferably, in step 2), after sieving through a 200-mesh sieve, compress the materials into blocks.

Preferably, in step 4), after granulation, sieve the ceramic powder through both a 60-mesh sieve and a 120-mesh sieve.

In the method for preparing a scheelite microwave dielectric ceramic material provided by the second aspect of the embodiment of the present invention, no sintering aid is required, the sintering temperature is low, and the preparation process is simple, and the material has a single phase.

Advantages of the embodiments of the present invention are partially elaborated in the following specification, a part of which is obvious according to the specification, or may be learnt by means of implementation of the embodiments of the present invention.

DETAILED DESCRIPTION OF ILLUSTRATIVE EMBODIMENTS

Embodiments of the present invention are further described below. The embodiments of the present invention are not limited to the following embodiments. Proper modifications to the implementation without departing from the scope of the principal claims are allowed.

In a first aspect, an embodiment of the present invention provides a scheelite microwave dielectric ceramic material, which features a high dielectric constant, good microwave performance, and an adjustable temperature coefficient of resonant frequency. In addition, the scheelite microwave dielectric ceramic material may be obtained by means of low-temperature sintering without adding any sintering aid, and therefore chemical composition and a preparation process are simple, and the material has a single phase. In a second aspect, an embodiment of the present invention provides a method for preparing a scheelite microwave dielectric ceramic material.

In a first aspect, an embodiment of the present invention provides a scheelite microwave dielectric ceramic material with the following structure expression:

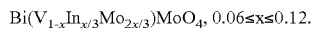

$Bi(V_{1-x}In_{x/3}Mo_{2x/3})MoO_4$, $0.06 \leq x \leq 0.12$.

The scheelite microwave dielectric ceramic material is based on a typical scheelite $ABO_4$, and $Bi^{+3}$ ion occupies A site, whereas $V^{5+}$, $In^{3+}$, and $Mo^{6+}$ ions jointly occupy B site. In this example, $0.08 \leq x \leq 0.10$.

A microwave dielectric constant $\in_r$ of the scheelite microwave dielectric ceramic material is 70-75, a quality factor value Q×f is 9230 GHz-10110 GHz, and a temperature coefficient of resonant frequency $\tau_f$ is −210 ppm/° C. to +135 ppm/° C.

The scheelite microwave dielectric ceramic material provided by the first aspect of the embodiment of the present invention features a high microwave dielectric constant, good microwave performance, and an adjustable temperature coefficient of resonant frequency, and may be used as a dielectric material such as a radio frequency multilayer ceramic capacitor, a chip microwave dielectric resonator or filter, low temperature co-fired ceramic (LTCC), a ceramic antenna, or a multi-chip module (MCM).

In a second aspect, an embodiment of the present invention provides a method for preparing a scheelite microwave dielectric ceramic material, including the following steps:

1) Determine ratios of materials $V_2O_5$, $In_2O_3$, $MoO_3$, and $Bi_2O_3$ according to a stoichiometry ratio in a general formula $Bi(V_{1-x}In_{x/3}Mo_{2x/3})MoO_4$, $0.06 \leq x \leq 0.12$.

2) Mix the materials in step 1), after 3-6 hours of ball-milling, drying at 100° C.-200° C., and sieving through a 200-mesh sieve, compress the materials into blocks.

3) Pre-sinter the blocks at 650° C.-750° C., and insulate the blocks for 4-6 hours to obtain sample clinkers.

4) Grind the sample clinkers, and after 5-6 hours of second ball-milling, drying at 100° C.-200° C., granulating, and sieving through both a 60-mesh sieve and a 120-mesh sieve, obtain ceramic powder.

5) Compress and mould the ceramic powder, sinter the powder for 2-3 hours at 780° C.-840° C. into ceramic, and then obtain a scheelite microwave dielectric ceramic material.

The scheelite microwave dielectric ceramic material is prepared by adopting a solid phase reaction sintering method, that is, low-temperature sintering at 780° C.-840° C. on a premise that no sintering aid is added, using low melting point oxides $MoO_3$, $Bi_2O_3$ and $V_2O_5$ as main elements, a typical scheelite $ABO_4$ as a basis, and with $Bi^{+3}$ ion occupying A site, and $V^{5+}$, $In^{3+}$, and $Mo^{6+}$ ions jointly occupying B site. First, select a formula with proper ratios, select appropriate initial oxides and appropriate replacements, mix the oxides evenly after a first ball-milling, and enable a preliminary reaction of the oxides through a pre-sintering process; then, grind the reactants through second ball-milling; and finally, obtain desired sample ceramic through a sintering process.

Once again, it is possible that $0.08 \leq x \leq 0.10$.

A microwave dielectric constant $\in_r$ of the scheelite microwave dielectric ceramic material is 70-75, a quality factor value Q×f is 9230 GHz-10110 GHz, and a temperature coefficient of resonant frequency $\tau_f$ is −210 ppm/° C. to +135 ppm/° C.

In step 2), after sieving through a 200-mesh sieve, compress the materials into blocks.

In step 4), after granulation, sieve the ceramic powder through both a 60-mesh sieve and a 120-mesh sieve.

In the method for preparing a scheelite microwave dielectric ceramic material provided by the second aspect of the embodiment of the present invention, no sintering aid is required, the sintering temperature is low, and the preparation process is simple, and the material has a single phase.

A first embodiment will be described now.

After purity analysis of materials, ratios of materials $V_2O_5$, $In_2O_3$, $MoO_3$, and $Bi_2O_3$ are determined according to a stoichiometry ratio in a general formula $Bi(V_{0.94}In_{0.02}Mo_{0.04})MoO_4$. After thorough mixing and 4 hours of ball-milling, and then drying, sieving, compressing and pre-sintering for 4 hours at 700° C., sample blocks after the pre-sintering are grinded, undergo second ball-milling for 5 hours, and are finely grinded, dried and granulated, and then desired ceramic powder is obtained after sieving through both a 60-mesh sieve and a 120-mesh sieve. Ceramic powder is compressed as required (into flakes or columns), and sintered in 780° C.-840° C. air for 2 hours into ceramic. Then a scheelite microwave dielectric ceramic material is obtained.

Performance of the scheelite microwave dielectric ceramic material meets the following indexes.

Sintering into ceramic in the 780° C.-840° C. air, dielectrical performance of microwave $\in_r$=73 (4.84 GHz), quality factor value Q=2,050, Qf=9,920 GHz, and temperature coefficient of resonant frequency in microwave TCF=−210 ppm/° C. (25° C.-85° C.).

A second embodiment will be described now.

After purity analysis of materials, ratios of materials $V_2O_5$, $In_2O_3$, $MoO_3$, and $Bi_2O_3$ are determined according to a stoichiometry ratio in a general formula. After thorough mixing and 4 hours of ball-milling, and then drying, sieving, compressing and pre-sintering for 4 hours at 700° C., sample blocks after the pre-sintering are grinded, undergo second ball-milling for 5 hours, and are finely grinded, dried and granulated, and then desired ceramics is obtained after sieving through both a 60-mesh sieve and a 120-mesh sieve. Ceramic powder is compressed as required (into flakes or columns), and sintered in 780° C.-840° C. air for 2 to 3 hours into ceramic. Then a scheelite microwave dielectric ceramic material of a high K value is obtained.

Performance of the scheelite microwave dielectric ceramic material meets the following indexes.

Sintering into ceramic in the 780° C.-840° C. air, dielectrical performance in microwave $\in_r$=75 (4.77 GHz), quality factor value Q=2,120, Qf=10,110 GHz, and temperature coefficient of resonant frequency TCF=−154 ppm/° C. (25° C.-85° C.).

A third embodiment will be described now

After purity analysis of materials, ratios of materials $V_2O_5$, $In_2O_3$, $MoO_3$, and $Bi_2O_3$ are determined according to a stoichiometry ratio in a general formula $Bi(V_{0.9}In_{0.03333}Mo_{0.06667})MoO_4$. After thorough mixing and 4 hours of ball-milling, and then drying, sieving, compressing and pre-sintering for 4 hours at 700° C., sample blocks after the pre-sintering are grinded, undergo second ball-milling for 5 hours, and are finely grinded, dried and granulated, and then desired ceramic powder is obtained after sieving through both a 60-mesh sieve and a 120-mesh sieve. Ceramic powder is compressed as required (into flakes or columns), and sintered in 780° C.-840° C. air for 2 to 3 hours into ceramic. Then a scheelite microwave dielectric ceramic material of a high K value is obtained.

Performance of the scheelite microwave dielectric ceramic material meets the following indexes.

Sintering into ceramic in the 780° C.-840° C. air, dielectrical performance in microwave $\in_r$=74 (4.91 GHz), quality factor value Q=1,910, Qf=9,380 GHz, and temperature coefficient of resonant frequency in microwave TCF=+65 ppm/° C. (25° C.-85° C.).

A fourth embodiment will be described now.

After purity analysis of materials, ratios of materials $V_2O_5$, $In_2O_3$, $MoO_3$, and $Bi_2O_3$ are determined according to a stoichiometry ratio in a general formula $Bi(V_{0.88}In_{0.04}Mo_{0.08})MoO_4$. After thorough mixing and 4 hours of ball-milling, and then drying, sieving, compressing and pre-sintering for 4 hours at 700° C., sample blocks after the pre-sintering are grinded, undergo second ball-milling for 5 hours, and are finely grinded, dried and granulated, and then desired ceramic powder is obtained after sieving through both a 60-mesh sieve and a 120-mesh sieve. Ceramic powder is compressed as required (into flakes or columns), and sintered in 780° C.-840° C. air for 2 to 3 hours into ceramic. Then a scheelite microwave dielectric ceramic material of a high K value is obtained.

Performance of the scheelite microwave dielectric ceramic material meets the following indexes.

Sintering into ceramic in the 780° C.-840° C. air, dielectrical performance in microwave $\in_r$=70 (5.13 GHz), quality factor value Q=1,800, Qf=9,230 GHz, and temperature coefficient of resonant frequency in microwave TCF=+135 ppm/° C. (25° C.-85° C.).

Detailed above are descriptions further made with reference to specific exemplary embodiments of the present invention, but are not intended to limit the embodiments of the present invention. Variations or replacements readily figured out by a person of ordinary skill in the prior art without departing from the idea of the present invention should fall within the protection scope of the present invention, which is determined by the submitted claims.

What is claimed is:

1. A scheelite microwave dielectric ceramic material, wherein a structure expression of the scheelite microwave dielectric ceramic material is $Bi(V_{1-x}In_{x/3}Mo_{2x/3})MoO_4$, where 0.06≤x≤0.12.

2. The scheelite microwave dielectric ceramic material according to claim 1, wherein 0.08≤x≤0.10.

3. The scheelite microwave dielectric ceramic material according to claim 1, wherein a microwave dielectric constant $\in_r$ of the scheelite microwave dielectric ceramic material is 70-75, a quality factor value Q×f is 9230 GHz-10110 GHz, and a temperature coefficient of resonant frequency $\tau_f$ is −210 ppm/° C. to +135 ppm/° C.

4. The scheelite microwave dielectric ceramic material according to claim 1, wherein a microwave dielectric constant $\in_r$ of the scheelite microwave dielectric ceramic material is 70-75.

5. The scheelite microwave dielectric ceramic material according to claim 1, wherein a quality factor value Q×f is 9230 GHz-10110 GHz.

6. The scheelite microwave dielectric ceramic material according to claim 1, wherein a temperature coefficient of resonant frequency $\tau_f$ is −210 ppm/° C. to +135 ppm/° C.

7. A method for preparing a scheelite microwave dielectric ceramic material, the method comprising:
mixing the materials that include $V_2O_5$, $In_2O_3$, $MoO_3$, and $Bi_2O_3$ according to a stoichiometry ratio consistent with a general formula $Bi(V_{1-x}In_{x/3}Mo_{2x/3})MoO_4$, where 0.06≤x≤0.12;
ball-milling the materials for 3 to 6 hours;
drying the ball-milled materials at 100° C.-200° C.;
sieving the dried ball-milled materials;
compressing the sieved materials into blocks;
pre-sintering the blocks at 650° C.-750° C.;
insulating the blocks for 4 to 6 hours to obtain sample clinkers;
grinding the sample clinkers;
ball-milling the sample clinkers for 5 to 6 hours;
drying the ball-milled sample clinkers at 100° C.-200° C.;
granulating and sieving the dried ball-milled sample clinkers to obtain a ceramic powder;
compressing and molding the ceramic powder; and
sintering the powder for 2 to 3 hours at 780° C.-840° C. to obtain a scheelite microwave dielectric ceramic material that has a structure expression $Bi(V_{1-x}In_{x/3}Mo_{2x/3})MoO_4$, where 0.06≤x≤0.12.

8. The method according to claim 7, wherein 0.08≤x≤0.10.

9. The method according to claim 7, wherein a microwave dielectric constant $\in_r$ of the scheelite microwave dielectric ceramic material is 70-75, a quality factor value Q×f is 9230 GHz-10110 GHz, and a temperature coefficient of resonant frequency $\tau_f$ is −210 ppm/° C. to +135 ppm/° C.

10. The method according to claim 7, wherein a temperature coefficient of resonant frequency $\tau_f$ is −210 ppm/° C. to +135 ppm/° C.

11. The method according to claim 7, wherein a microwave dielectric constant $\in_r$ of the scheelite microwave dielectric ceramic material is 70-75.

12. The method according to claim 7, wherein a quality factor value Q×f is 9230 GHz-10110 GHz.

13. The method according to claim 7, wherein the sieving comprises sieving through a 200-mesh sieve.

14. The method according to claim 7, wherein, after the granulating, the ceramic powder is sieved through both a 60-mesh sieve and a 120-mesh sieve.

* * * * *